UNITED STATES PATENT OFFICE.

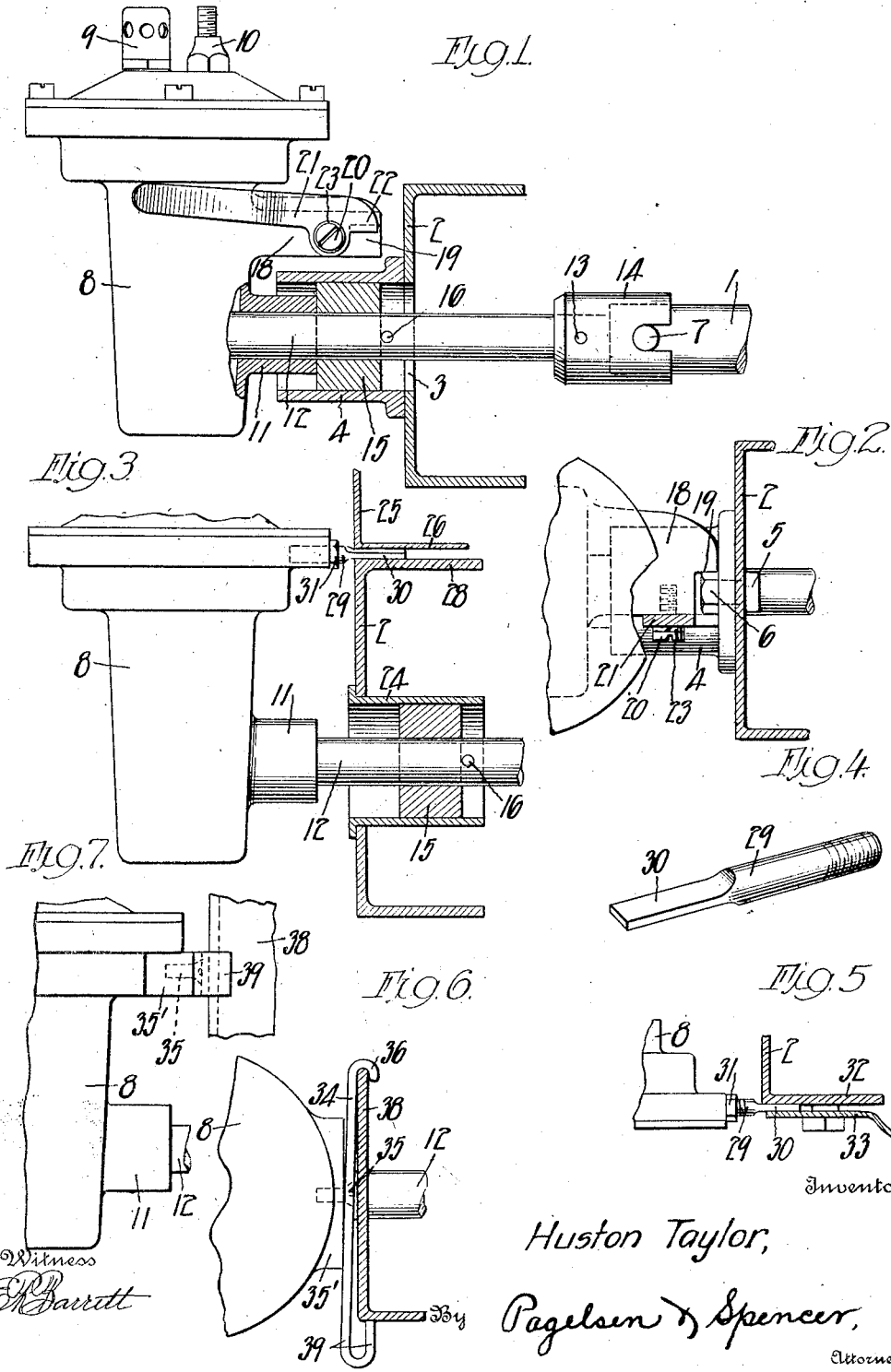

HUSTON TAYLOR, OF DETROIT, MICHIGAN, ASSIGNOR TO DETROIT CARRIER & MANUFACTURING COMPANY, OF DETROIT, MICHIGAN, A CORPORATION OF DELAWARE.

TIRE-PUMP.

1,369,059.      Specification of Letters Patent.     Patented Feb. 22, 1921.

Application filed December 16, 1915. Serial No. 67,146.

*To all whom it may concern:*

Be it known that I, HUSTON TAYLOR, a citizen of the United States, and residing at Detroit, in the county of Wayne and State of Michigan, have invented a new and Improved Tire-Pump, of which the following is a specification.

Various constructions have been proposed for attaching tire pumps to a driven shaft of a motor vehicle, but because of initial expense, number of parts or for other reasons, they have failed to go into use to any great extent. To object of the present invention is to provide very cheaply a simple and compact device of this nature which is applicable to cars of different designs and which may be quickly secured in operative position or may be readily detached from the car altogether.

The invention consists in an improved bearing means for the pump shaft whereby the latter is detachably supported in substantial alinement with a driven shaft of the vehicle; also in improved means for preventing rotation of the pump body about the axis of the driven shaft; also in the details of construction shown, described and claimed.

In the drawings, Figure 1 is a part side view, part vertical section through the front end of a motor vehicle showing the pump clutched to the engine shaft but not yet clamped to the guide securing nut. Fig. 2 is a similar view, the pump being turned down substantially 90° and clamped to the nut. Fig. 3 is a view corresponding to Fig. 1, illustrating another embodiment of the invention. Fig. 4 is a perspective view of the pin whereby the pump is prevented from rotating. Fig. 5 is a fragmentary view, similar to Fig. 3, showing the pin inserted between the front cross bar and the mud or dust pan. Fig. 6 is a part vertical section, part elevation showing a third embodiment. Fig. 7 is a fragmentary bottom plan view corresponding to Fig. 6.

Like reference characters designate like parts.

Referring particularly to Fig. 1, 1 indicates the front end of the usual longitudinally extending engine shaft that terminates in proximity to the front cross bar 2 pierced at 3 and having projecting forwardly therefrom the usual tubular guide or sleeve 4 through which a starting crank (not shown) may be inserted. The guide is secured to the cross bar by the customary bolts 5 and nuts 6, Fig. 2. The engine shaft has projecting therefrom the ends of the usual cross pin or clutch member 7.

The pump body 8, provided with the intake 9 and discharge fitting 10 to which a hose (not shown) may be attached, is preferably of the well known diaphragm type and projecting therefrom is a tubular bearing 11 in which the pump shaft 12 is rotatable. The latter projects from the bearing and has secured thereto by the cross pin 13, or otherwise, a tubular clutch member 14 slotted to receive the clutch member 7. Interposed between the pump shaft and the guide 4 and fitting closely to the inner surface of the latter is a bearing 15, the longitudinal movement of which, relatively to the pump shaft, is limited by the cross pin 16. The external dimensions of this bearing may be varied to conform to the guides on the different cars so that it is only necessary to change the bearing (by removing the pins 16 and 13 and the clutch member 14) in order to adapt the pump to a particular car.

The pump body is provided with a lug 18 having a contact face 19 which comes into engagement with the face of the nut 6 or bolt 5, as the case may be, when the pump is swung toward the observer substantially 90° from the position shown in Fig. 1, as best indicated in Fig. 2. Mounted on a pivot 20, which projects from the lug in a line at right angles to the face 19, is a clamping lever 21, the end 22 of which is adapted to engage the nut or bolt on the side opposite the face, a spring washer 23 being interposed between the lever and the head of the pivot whereby the lever is allowed to accommodate itself to variations in size and adjustment of the nut or bolt and whereby it is held in resilient clamping relation thereto. It will be understood that the engine shaft normally turns in the direction indicated by the arrow in Fig. 1, which causes the face 19 to bear directly on the nut or bolt; the clamping lever prevents back lash or motion in the opposite direction.

In the embodiment of the invention illustrated in Figs. 3 and 4, the guide or sleeve 24, which corresponds to the guide 4, extends rearwardly through the perforation in the cross bar, being secured in place by pressing or otherwise. The radiator is shown at 25, its bottom 26 being, as usual, spaced slightly from the upper flange 28 of the cross bar. Threaded into the pump body and projecting therefrom in a line parallel to the pump shaft is a pin 29 adapted to be received between the bottom 26 and flange 28, whereby rotation of the pump body about the axis of the engine shaft is prevented. Since the space between the bottom and flange is both small and variable, it is preferred to flatten the end 30 of the pin 29 and to provide a lock nut 31, thus allowing the pin to be turned in such manner that the end 30 engages the inclosing surfaces of the corresponding car fairly closely. The lock nut, of course, retains the pin in adjusted position.

The modification shown in Fig. 5 differs from that just described merely in that the pin is inserted between the lower flange 32 of the cross bar and the upper face of the mud or dust pan 33.

In either of the two constructions last described, it is only necessary to insert the pump shaft through the guide until the clutch members are engaged, after which the pump body and engine shaft may be rotated until the pin 29 comes into alinement with the slot or opening, whereupon the pump is thrust rearwardly until the parts are fully engaged.

Referring now to Figs. 6 and 7, the means whereby the pump body is prevented from rotating consists in a clip 34, preferably resilient and pivoted by the screw 35 to a lug 35' on the body. This clip includes the hooked upper end 36 that engages over the upper edge or face of the cross bar 38 and the offset, preferably hook-shaped lower end 39 that contacts with the lower face of the cross bar and prevents back lash or reverse motion of the pump. By grasping the end 39 and pulling forwardly, it may be easily disengaged from the cross bar, after which the pump may be turned backwardly a slight distance and the pump drawn forwardly and detached from the engine shaft. It will be observed that the clip, when engaged, prevents both rotative and longitudinal movements of the pump body in respect to the axis of the engine shaft, and that it may be turned about the screw 35 to accommodate itself to the depth of the cross bar of the particular car, after which the screw may be set up to clamp the clip in position.

It is clear that the details of construction may be varied without departing from the spirit of my invention. I do not, therefore, wish to be limited otherwise than as indicated by the subjoined claims.

I claim:—

1. In combination with a perforated fixed portion of a motor vehicle and a driven shaft thereof alined with said perforation, a detachable tire pump including a pump body and a pump shaft projecting therefrom, a removable bearing for the pump shaft separate from the pump body and receivable in the perforation in the fixed portion, and means whereby the pump shaft is driven from the driven shaft when the bearing is inserted in the perforation.

2. In combination with a fixed starter crank guide sleeve of a motor vehicle and the engine shaft thereof alined with said sleeve, a detachable tire pump including a pump body and a pump shaft projecting therefrom, a removable bearing for the pump shaft separate from the body and receivable in the guide sleeve, and means whereby the projecting end of the pump shaft is driven from the engine shaft when the bearing is inserted in the sleeve.

3. In combination with a fixed starter crank guide sleeve of a motor vehicle and the engine shaft thereof alined with said sleeve, a detachable tire pump including a pump body and a pump shaft projecting therefrom, a removable bearing for the pump shaft separate from the pump body and receivable in the guide sleeve, means whereby the projecting end of the pump shaft is driven from the engine shaft when the bearing is inserted in the sleeve, and means for preventing rotation of the pump body about the axis of the engine shaft.

4. In combination with a driven shaft of a motor vehicle having a clutch means thereon, and a fixed member of the vehicle, said fixed member having an opening therethrough alined with the driven shaft to allow access to the end of the latter, a pump body, a pump shaft projecting therefrom, clutch means on the pump shaft arranged to engage the clutch means on the driven shaft, and a removable bearing for the pump shaft separate from the pump body and receivable in the opening in the fixed member and engaging the wall thereof, whereby the pump shaft is maintained in substantial alinement with the driven shaft.

5. In combination with a driven shaft of a motor vehicle having a clutch means thereon, and a fixed member of the vehicle, said fixed member having an opening therethrough alined with the driven shaft to allow access to the end of the latter, a pump body, a pump shaft projecting therefrom, clutch means on the pump shaft arranged to engage the clutch means on the driven shaft, a removable bearing for the pump separate from the pump body and receivable in the opening in the fixed member and engaging the wall thereof, whereby the pump shaft is maintained in substantial alinement with the driven shaft, and a single means for preventing rotation of the pump body in either direction about the axis of the driven shaft.

6. In combination with a fixed portion and a driven shaft of a motor vehicle and a detachable tire pump having a pump shaft in substantial alinement with and detachably coupled to the driven shaft, a single means for engaging the fixed portion of the vehicle to prevent rotation of the pump body in both directions in respect to the driven shaft, said means comprising a member that is brought into engagement with said fixed portion by a movement of the pump body substantially parallel to the driven shaft.

7. In combination with the front cross bar and the engine shaft of a motor vehicle and a detachable tire pump having a pump shaft in substantial alinement with and detachably coupled to the engine shaft, means for preventing rotation of the pump body in both directions in respect to the engine shaft, said means comprising a member arranged to engage the cross bar by a movement of the pump body toward and substantially parallel to the engine shaft.

8. In combination with the front cross bar and the engine shaft of a motor vehicle and a detachable tire pump having a pump shaft in substantial alinement with and detachably coupled to the engine shaft, means for preventing rotation of the pump body in both directions in respect to the engine shaft, said means comprising a member arranged to engage the cross bar by a movement of the pump body toward and substantially parallel to the engine shaft, said last mentioned member being rotatable about an axis parallel to the pump shaft to accommodate itself to the cross bar.

9. In combination with a fixed portion and a driven shaft of a motor vehicle and a detachable tire pump having a pump shaft in substantial alinement with and detachably coupled to the driven shaft, means for engaging the fixed portion of the vehicle to prevent rotation of the pump body in both directions in respect to the driven shaft, said means comprising a member that is brought into engagement with said fixed portion by a movement of the pump body substantially parallel to the driven shaft, said last mentioned member being rotatable about an axis parallel to the pump shaft to accommodate itself to the fixed portion of the vehicle.

10. In combination with a fixed portion and a driven shaft of a motor vehicle and a detachable tire pump having a pump shaft in substantial alinement with and detachably coupled to the driven shaft, means for engaging the fixed portion of the vehicle to prevent rotation of the pump body in both directions in respect to the driven shaft, said means comprising a member that is brought into engagement with said fixed portion by a movement of the pump body substantially parallel to the driven shaft, said last mentioned member being rotatable about an axis parallel to the pump shaft to accommodate itself to the fixed portion of the vehicle, and means for locking the member in a desired position of adjustment.

11. In combination with the engine shaft of a motor vehicle, the front cross bar and another member spaced vertically slightly from the cross bar, a detachable tire pump having a pump shaft in substantial alinement with and detachably coupled to the engine shaft, means for preventing rotation of the pump body in both directions in respect to the engine shaft, said means comprising a pin adapted to be inserted between the cross bar and the member which is spaced therefrom.

12. In combination with the engine shaft of a motor vehicle and a fixed portion of the vehicle, said fixed portion including an opening or socket, a detachable tire pump having a pump shaft in substantial alinement with and detachably coupled to the engine shaft, means for preventing rotation of the pump body in both directions in respect to the engine shaft, said means comprising a pin adapted to be inserted into the opening or socket by a movement otherwise than substantially at right angles to the axis of the driven shaft.

13. In combination with the engine shaft and with a fixed portion of a motor vehicle, said fixed portion including a perforated front cross bar, a detachable tire pump having a pump shaft passing through the perforation in the cross bar, said pump shaft being in alinement with and detachably coupled to the engine shaft, means for preventing rotation of the pump body in both directions in respect to the engine shaft, said means including a member arranged to engage the front cross bar some distance from the axis of the engine shaft.

14. In combination with a perforated fixed portion of a motor vehicle and a driven shaft thereof alined with said perforation, a detachable tire pump including a pump body and a pump shaft projecting therefrom, a removable bearing for the pump shaft separate from the pump body and receivable in the perforation in the fixed portion, said pump shaft being supported by the bearing and in rotatable engagement therewith when the bearing is received in the perforation, and means whereby the pump shaft is driven from the driven shaft when the bearing is inserted in the perforation.

15. In combination with a fixed starter crank guide sleeve of a motor vehicle and the engine shaft thereof alined with said sleeve, a detachable tire pump including a pump body and a pump shaft projecting therefrom, a removable bearing for the pump shaft separate from the pump body and receivable in the guide sleeve, said pump shaft being supported by the bearing and in rotatable engagement therewith when the bearing is received in the perforation, and means whereby the projecting end of the pump shaft is driven from the engine shaft when the bearing is inserted in the sleeve.

16. In combination with a fixed portion and a driven shaft of a motor vehicle and a detachable tire pump having a pump shaft in substantial alinement with and detachably coupled to the driven shaft, means for engaging the fixed portion of the vehicle to prevent rotation of the pump body in both directions in respect to the driven shaft, said means comprising a member that is brought into engagement with said fixed portion by a movement of the pump body substantially parallel to the driven shaft, said member being movable in respect to said pump body.

17. In combination with a fixed portion and a driven shaft of a motor vehicle and a detachable tire pump having a pump shaft in substantial alinement with and detachably coupled to the driven shaft, means for engaging the fixed portion of the vehicle to prevent rotation of the pump body in both directions in respect to the driven shaft, said means comprising a member that is brought into engagement with said fixed portion by a movement of the pump body substantially parallel to the driven shaft, said member being movable in respect to said pump body in a direction substantially parallel to the axis of the pump shaft.

18. In combination with the engine shaft and with a relatively fixed portion of a motor vehicle, a detachable tire pump having a pump shaft in substantial alinement with and detachably coupled to the engine shaft, means for preventing rotation of the pump body in both directions in respect to the engine shaft, said means including a member carried by the pump body for engaging the fixed portion of the vehicle and movable in respect thereto along a line substantially parallel to the axis of the pump shaft.

19. In combination, a perforated front brace of the frame of a motor vehicle and an engine shaft extending longitudinally of said vehicle in alinement with the perforation in said brace, a tubular member rigid with said brace and in alinement with the engine shaft, together with a detachable tire pump having a pump body and a projecting pump shaft, and a bearing for said shaft, said bearing being separate from said body and being receivable in the tubular member to hold the pump in alinement with the engine shaft, and means for coupling the shafts together.

In testimony whereof I sign this specification.

HUSTON TAYLOR.